(12) United States Patent
Kertis

(10) Patent No.: US 6,233,598 B1
(45) Date of Patent: May 15, 2001

(54) INTERLEAVED FINITE IMPULSE RESPONSE (FIR) FILTER FUNCTIONS FOR SERVO AND DATA DETECTION IN A DIRECT ACCESS STORAGE DEVICE (DASD)

(75) Inventor: Robert Andrew Kertis, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/151,433

(22) Filed: Sep. 11, 1998

(51) Int. Cl.[7] .................................................. G06G 7/02
(52) U.S. Cl. ................................................... 708/819
(58) Field of Search .................................... 708/313, 316, 708/319, 819

(56) References Cited

U.S. PATENT DOCUMENTS

| | | | |
|---|---|---|---|
| 4,691,292 | * 9/1987 | Rothweiler | 708/316 |
| 4,777,612 | * 10/1988 | Tomimitsu | 708/316 |
| 4,866,647 | * 9/1989 | Farrow | 708/313 |
| 5,438,532 | * 8/1995 | Nagao et al. | 708/316 |
| 5,563,819 | * 10/1996 | Nelson | 708/819 |
| 5,931,899 | * 8/1999 | Kertis | 708/835 |

* cited by examiner

*Primary Examiner*—Tan V. Mai
(74) *Attorney, Agent, or Firm*—Joan Pennington (57) ABSTRACT

An interleaved finite impulse response (FIR) filter apparatus is provided for data detection in a direct access storage device. The FIR filter includes a plurality of sample and hold circuits. Each sample and hold circuit samples an input signal sequentially at a clock rate. At least one set of multiple multipliers is coupled to the plurality of sample and hold circuits. Each multiplier multiplies a sample by a predefined value and provides a multiplier product at the clock rate. At least a pair of summing functions are coupled to the set of multipliers. Each summing function adds a predetermined combination of respective multiplier products and provides at least a pair of interleave outputs. Each of the interleave outputs is provided at less than the clock rate.

10 Claims, 10 Drawing Sheets

INTERLEAVED FINITE IMPULSE RESPONSE (FIR) FILTER FUNCTIONS FOR SERVO AND DATA DETECTION IN A DIRECT ACCESS STORAGE DEVICE (DASD)

FIELD OF THE INVENTION

The present invention relates to methods and apparatus for detecting data, and more particularly to, interleaved finite impulse response (FIR) filter functions for servo and data detection in a direct access storage device.

DESCRIPTION OF THE RELATED ART

Direct access storage devices (DASDs) often incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. Typically servo information is provided on one or more disk surfaces for reading by the transducer heads for accurately and reliably positioning transducer heads on the disk surfaces at a specific location to read and write data.

As channel speeds go faster, conventional arrangements of circuit functions can be a limiting factor in overall performance. In the design of new DASDs, the performance requirements can be more demanding than the channel can deliver with traditional architectures.

A need exists for an improved, faster finite impulse response (FIR) filter apparatus for servo and data detection in a direct access storage device.

SUMMARY OF THE INVENTION

A principal object of the present invention is to provide an interleaved finite impulse response (FIR) filter apparatus for data detection in a direct access storage device. Other important objects of the present invention are to provide such interleaved finite impulse response (FIR) filter apparatus substantially without negative effects; and to provide such interleaved finite impulse response (FIR) filter apparatus that overcome some of the disadvantages of prior art arrangements.

In brief, an interleaved finite impulse response (FIR) filter apparatus is provided for data detection in a direct access storage device. The FIR filter includes a plurality of sample and hold circuits. Each sample and hold circuit samples an input signal sequentially at a clock rate. At least one set of multiple multipliers is coupled to the plurality of sample and hold circuits. Each multiplier multiplies a sample by a predefined value and provides a multiplier product at the clock rate. At least a pair of summing functions are coupled to the set of multipliers. Each summing function adds a predetermined combination of respective multiplier products and provides at least a pair of interleave outputs. Each of the interleave outputs is provided at less than the clock rate.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
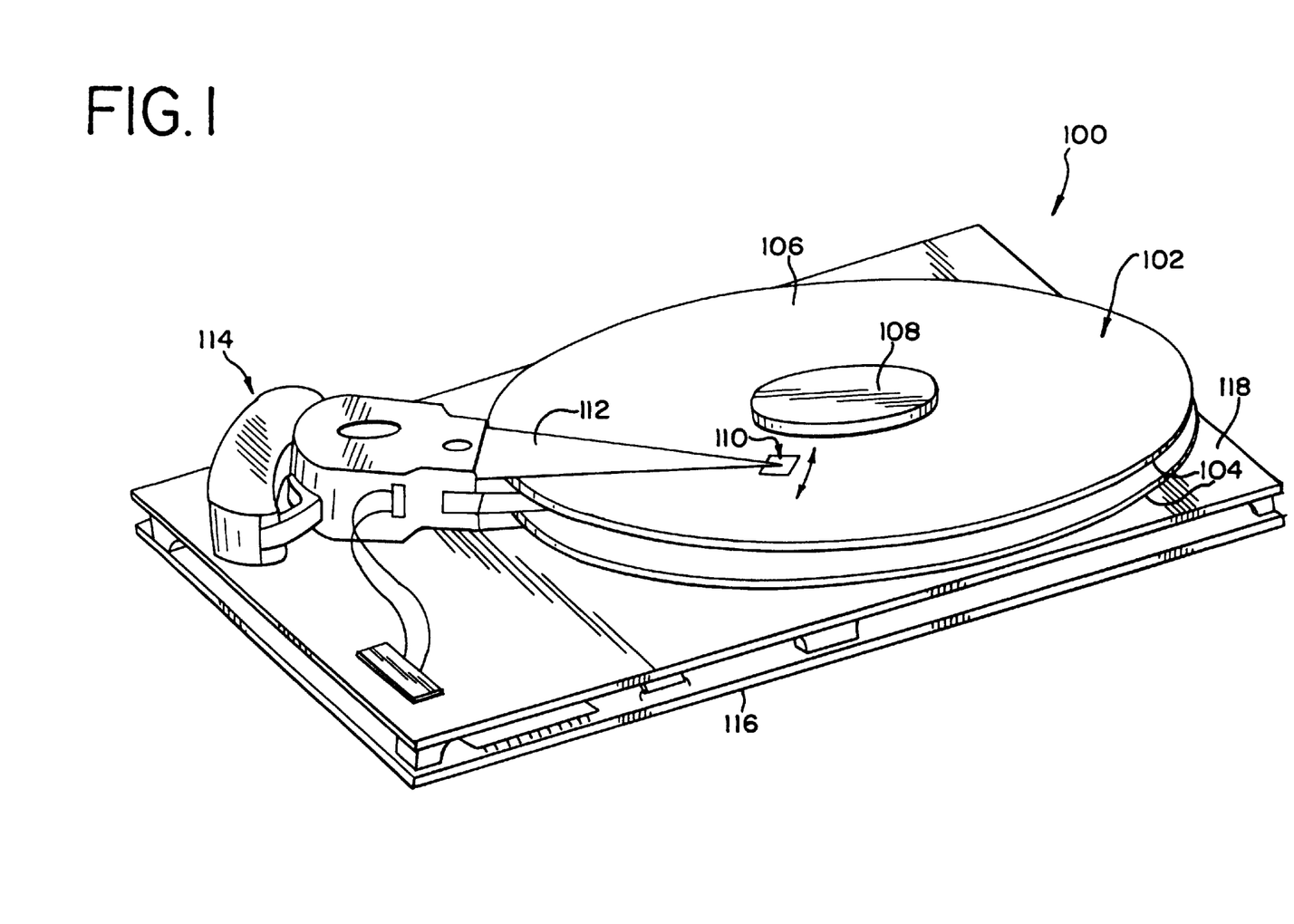
FIG. 1 is a diagrammatic view of a direct access storage device (DASD) embodying the present invention.

Referring now to the drawings, in FIG. 1 there is illustrated a direct access data storage device (DASD) generally designated as 100 including a stack 102 of disks 104 each having at least one magnetic surface 106. The disks 104 are mounted parallel to one another for simultaneous rotation on and by an integrated spindle and motor assembly 108. Information on each magnetic disk surface 106 is read from or written to the disk surface 106 by a corresponding transducer head assembly 110 movable in a path having a radial component across the rotating disk surface 106.

Each transducer head assembly 110 is carried by an arm 112. The arms 112 are ganged together for simultaneous pivotal movement by a voice coil motor (VCM) magnet assembly 114. Drive signals applied to the VCM magnet assembly 114 cause the arms 112 to move in unison to position the transducer head assemblies 110 in registration with information storage tracks on the disk surfaces 106 where information is written or read. As shown in FIG. 1, an electronics card 116 is mounted together with a base support 118 of DASD 100. The utility of the present invention is not restricted to the details of a particular DASD construction.

Figure 2:
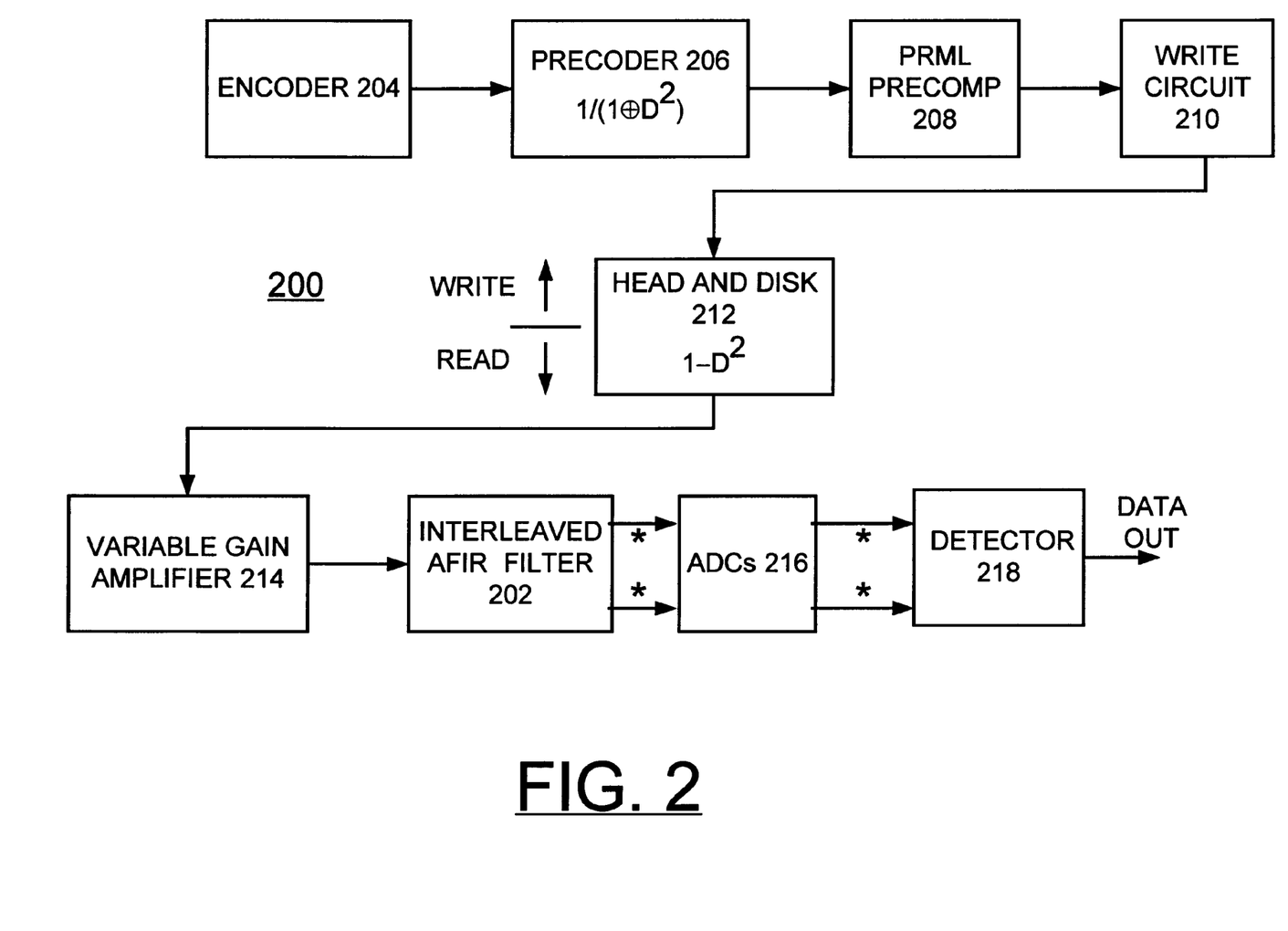
FIG. 2 is a block diagram of a data channel of the direct access storage device (DASD) of FIG. 1 embodying the present invention.
Figure 5:
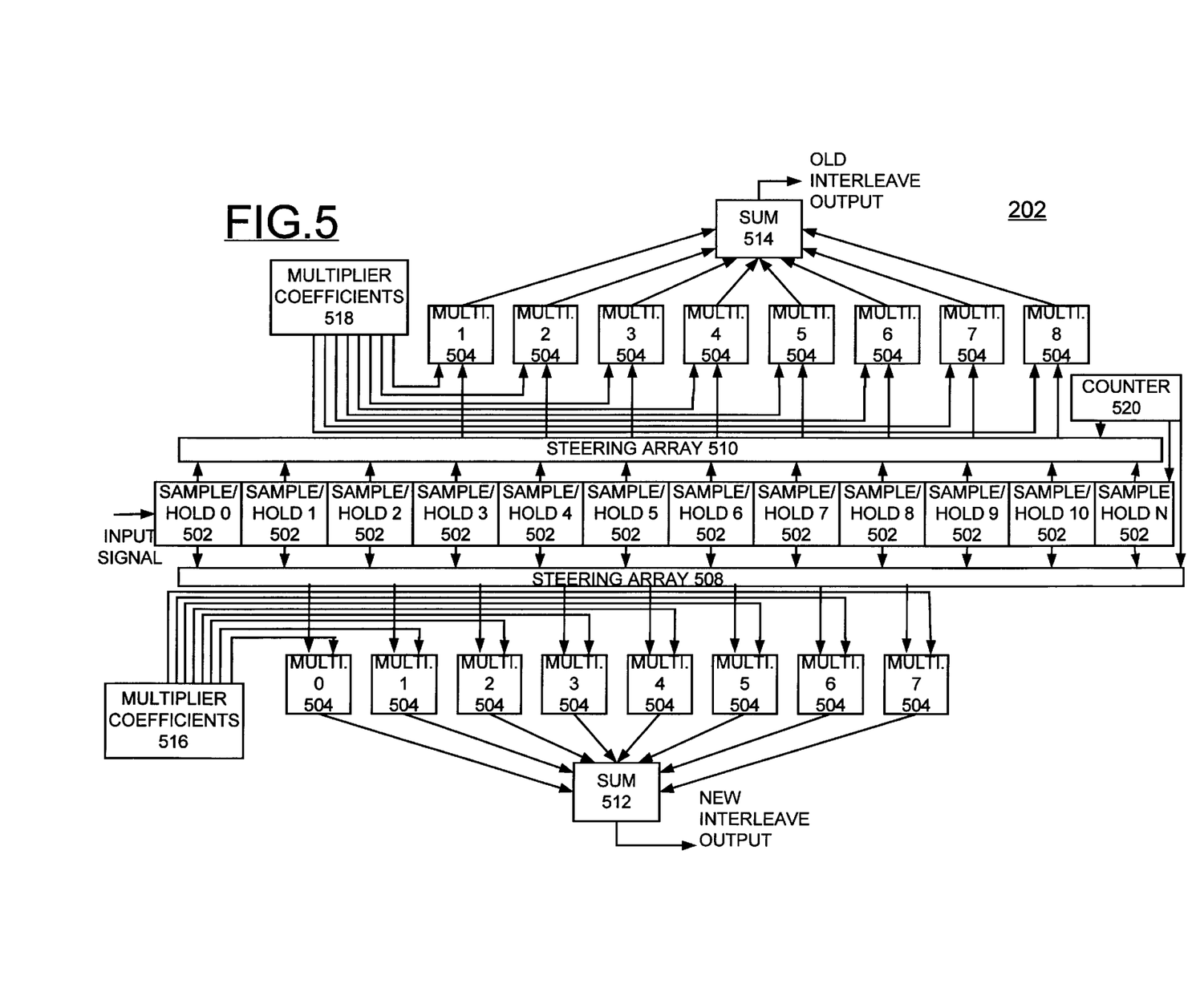
FIG. 5 is a block diagram of an interleaved analog finite impulse response (AFIR) filter arranged in accordance with the present invention.
Figure 8:
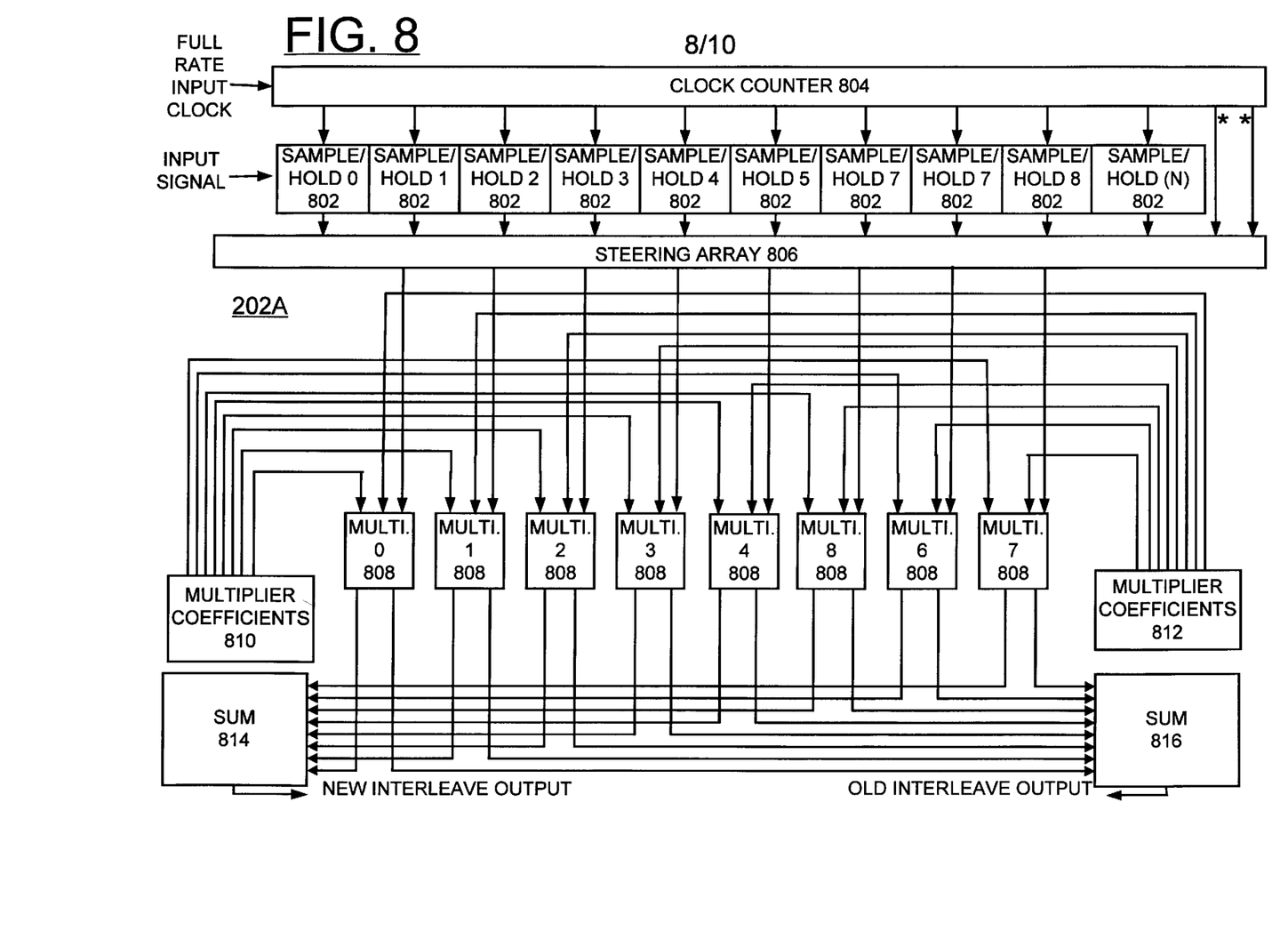
FIG. 8 is a block diagram of an alternative embodiment of an interleaved analog finite impulse response (AFIR) filter arranged in accordance with the present invention.

Referring now to FIG. 2, there is shown a block diagram of a partial-response maximum-likelihood (PRML) channel 200 available in the DASD 100 including an interleaved analog finite infinite response (AFIR) filter 202 of the invention. A first embodiment of the interleaved AFIR 202 is illustrated in FIG. 5. Another embodiment of the interleaved AFIR 202A is illustrated in FIG. 8. In accordance with features of the invention, the interleaved analog finite impulse response (AFIR) filters 202 and 202A advantageously operate at one-half bit rate, allowing a very high speed maximum possible data rate.

Data to be written is applied to an encoder 204 for providing a modulation coded output having predefined run length constraints. A precoder 206 follows the encoder 204 described by a $1/(1 \oplus D^2)$ operation where D is a unit delay operator and the symbol $\oplus$ is used to represent modulo-2 addition. Modulo-2 addition can be thought of as an exclusive or operation. A PRML precomp 208 coupled to the precoder 206 provides a modulated binary pulse signal applied to a write circuit 210 that provides the modulated write current for writing to the disk surface. An analog read signal is obtained at head and disk block 212 described by the $(1-D^2)$ operation. The read signal is applied to a variable gain amplifier (VGA) 214 and the amplified read signal is applied to the interleaved AFIR 202 or 202A. The interleaved filtered read signals are converted to digital form by analog-to-digital converters (ADCs) 216 that provide, for example, 64 possible 6-bit sampled values. The filtered signals from the interleaved AFIR filter 202 can be a class IV partial response (PR4) signal. The samples of the ADCs 216 are applied to a detector 218 to complete the detection process for data read back. It should be understood that the interleaved AFIR filters 202, 202A of the invention are not limited to use in the illustrated PRML data channel 200. The interleaved AFIR filters 202, 202A of the invention can be used with various servo and data detection techniques.

Figure 3:
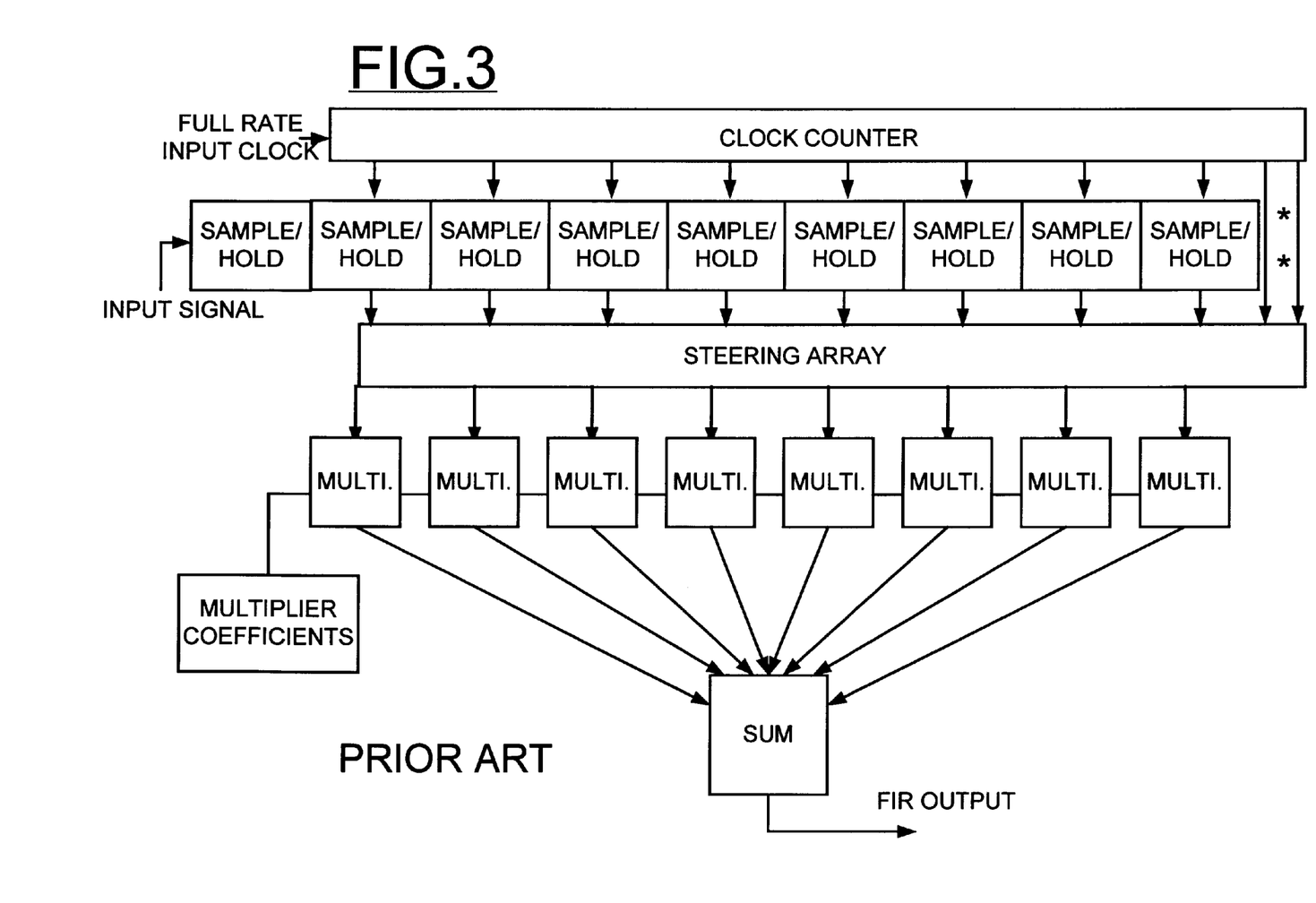
FIG. 3 is a block diagram illustrating a known analog finite impulse response (AFIR) filter.

FIG. 3 illustrates a known analog FIR function which takes eight consecutive samples, multiplies the respective sample values by programmable coefficients and then sums the result. A counter clocked by a full rate clock is used to determine which sample and hold circuit takes a sample at a give time or goes into tracking mode to follow the input waveform. Combinations of eight consecutive samples are steered to the respective multipliers by a steering array and are clocked at the full rate clock, for example, by the clock counter. Each multiplier has an independent constant which is used by the multiplier. The results of the eight products are added together by the SUM function to give a final FIR filtered output.

Figure 4:
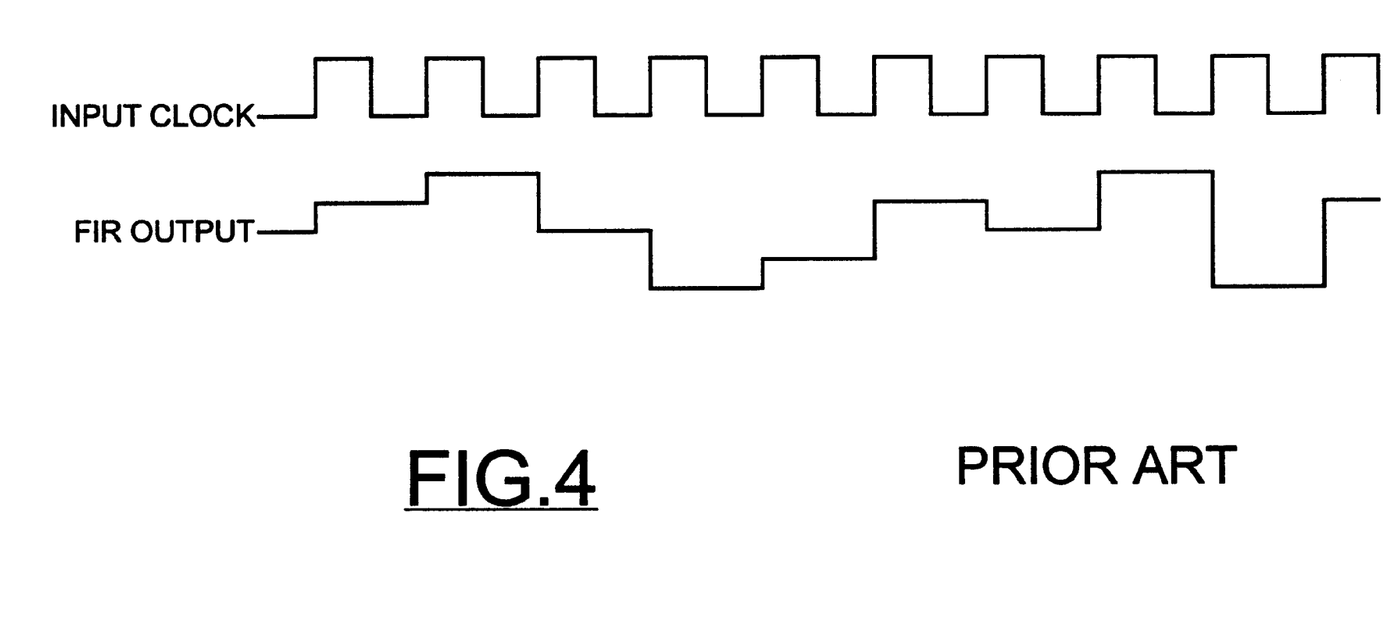
FIG. 4 is a chart illustrating the operation of the known analog finite impulse response (AFIR) filter of FIG. 3.

FIG. 4 illustrates a FIR filtered output waveform with respect to an input clock for the conventional analog FIR of FIG. 3. The input clock rate typically is equal to the data rate of the data channel 200 multiplied by a coding factor. The output of the FIR changes on the rising edge of each clock period and is valid for only a portion of the clock period. The ADC 216, which quantizes the FIR output needs some setup and hold margin around its sampling time point. At high frequencies, the FIR output settling to the appropriate level utilizes time needed for the setup margin for ADC quantization.

Referring to FIG. 5, a first embodiment of the interleaved analog FIR generally designated as 202 of the invention is shown. Interleaved analog FIR 202 solves the timing problem of the known arrangement of FIG. 3. In the interleaved analog FIR 202, two interleaved FIR outputs OLD INTERLEAVE OUTPUT and NEW INTERLEAVE OUTPUT are produced. Parallel and alternating interleaved FIR outputs OLD INTERLEAVE OUTPUT and NEW INTERLEAVE OUTPUT which can be produced by the interleaved analog FIR 202 are illustrated in FIGS. 6 and 7.

In accordance with features of the invention, in the interleaved analog FIR 202 of FIG. 5 and in the interleaved analog FIR 202A of FIG. 8, each of the two interleaved FIR outputs change state or transition every two periods of the full rate input clock. Both interleaved analog FIR filters 202 and 202A allow for substantially higher clocking frequencies than the known non-interleaved analog FIR of FIG. 3.

As shown in FIG. 5, interleaved analog FIR 202 includes a plurality of sample and hold circuits (0–N) 502, such as twelve sample and hold circuits 502 as shown. A respective one of the sample and hold circuits 502 sample the input signal each clock cycle. Interleaved analog FIR 202 includes a pair of parallel sets of multipliers 504. Each set of multipliers 504 is coupled to the sample and hold circuits 502 by a respective one of a pair of steering arrays 508 and 510. A pair of sum functions 512 and 514 are coupled to the sets of multipliers 504. The sum function 512 adds together the products of a combination of the multipliers 504 providing the NEW INTERLEAVE OUTPUT. The sum function 514 adds together the products of a combination of the multipliers 504 providing the OLD INTERLEAVE OUTPUT. A pair of multiplier coefficients functions 516 and 518 are coupled to the multipliers 504. The multiplier coefficients function 516 provides independent multiplier coefficients for each multiplier 504 of the first set of multipliers 504. Similarly, the multiplier coefficients function 518 provides independent multiplier coefficients for each multiplier 504 of the second set of multipliers 504. A counter 520 receives the full rate clock signal and provides clocking signals to the plurality of sample and hold circuits (0–N) 502, and the steering arrays 508 and 510. The clocking method of the steering arrays 508 and 510 determines whether the NEW INTERLEAVE OUTPUT and the OLD INTERLEAVE OUTPUT transition in a parallel fashion illustrated in FIG. 6 or alternating fashion illustrated in FIG. 7.

Figure 6:
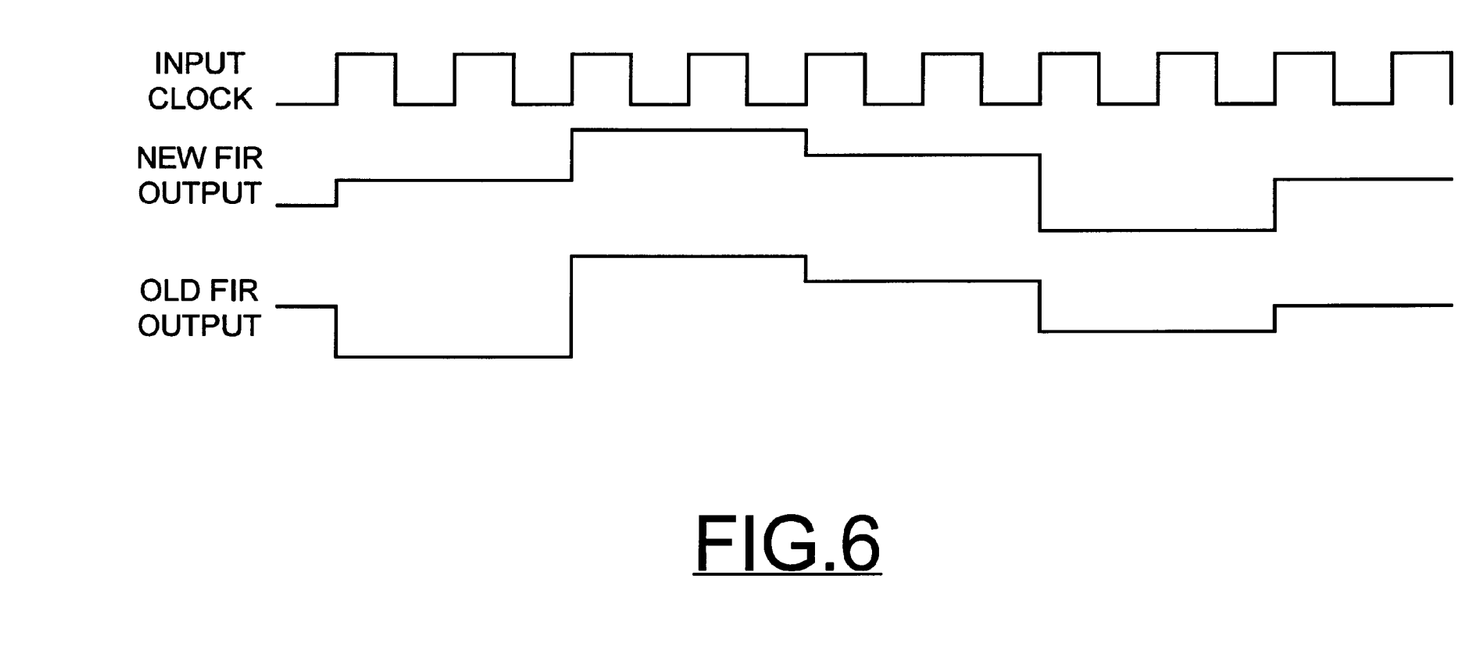
FIGS. 6 and 7 are charts illustrating the operation of the interleaved analog finite impulse response (AFIR) filter of FIG. 5.
Figure 7:
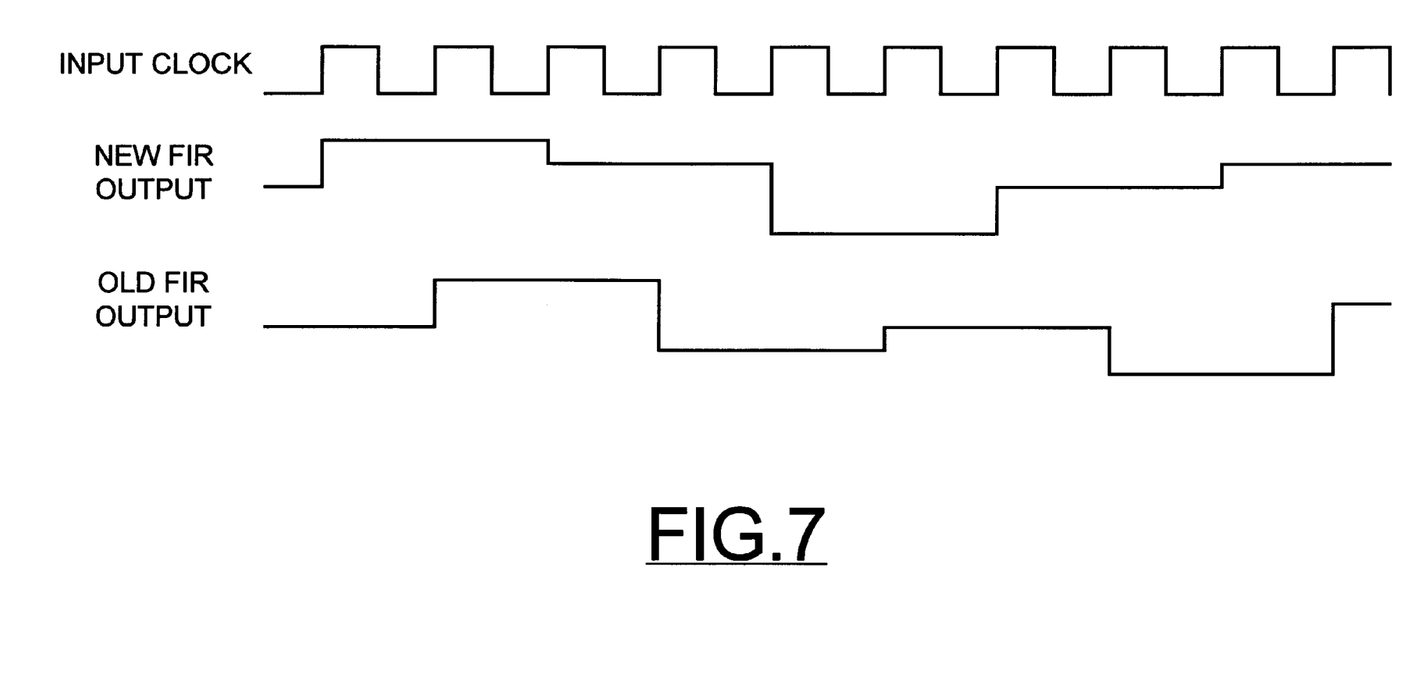

Referring to FIGS. 6 and 7, the interleaved FIR outputs OLD INTERLEAVE OUTPUT and NEW INTERLEAVE OUTPUT are shown with respect to an input clock signal. The interleaved FIR outputs OLD INTERLEAVE OUTPUT and NEW INTERLEAVE OUTPUT can be produced either in parallel as shown in FIG. 6 or in an alternating fashion as shown in FIG. 7. Each interleaved FIR output transitions every two periods of the input clock, as shown.

Referring now to FIG. 8, there is shown an alternative embodiment of an interleaved analog finite impulse response (AFIR) filter generally designated 202A and arranged in accordance with the present invention. Interleaved analog FIR 202A also solves the timing problem of the known arrangement of FIG. 3. In the interleaved analog FIR 202A, two interleaved FIR outputs OLD INTERLEAVE OUTPUT and NEW INTERLEAVE OUTPUT are produced. Parallel and alternating interleaved FIR outputs OLD INTERLEAVE OUTPUT and NEW INTERLEAVE OUTPUT can be produced by the interleaved analog FIR 202A as illustrated in FIGS. 6 and 7.

Interleaved analog FIR 202A includes a plurality of sample and hold circuits (0–N) 802, such as ten sample and hold circuits 802 as shown. A respective one of the sample and hold circuits 802 sample the input signal each clock cycle when clocked by a clock counter 804. The clock counter 804 receives the full rate clock signal and provides clocking signals to the plurality of sample and hold circuits (0–N) 802, and a steering array 806. The steering array 806 receiving clock signals from the clock counter 804 couples combinations of samples from predetermined ones of the sample and hold circuits 802 to a set of multipliers 808. Each of the multipliers 808 includes two inputs for receiving two independent multiplier coefficients from a pair of multiplier coefficients functions 810 and 812. The multipliers 808 use the independent multiplier coefficients for generating old and new interleave outputs. The old and new interleave multiplier results of the multipliers 808 respectively are applied to a pair of sum functions 814 and 816 coupled to the outputs of multipliers 808. The sum function 814 adds together the products of each of the multipliers 808 providing the NEW INTERLEAVE OUTPUT. The sum function 816 adds together the products of each of the multipliers 808 providing the OLD INTERLEAVE OUTPUT. The clocking method of the steering array 806 determines whether the NEW INTERLEAVE OUTPUT and the OLD INTERLEAVE OUTPUT transition in a parallel fashion illustrated in FIG. 6 or alternating fashion illustrated in FIG. 7.

In the interleaved AFIR filters 202 of FIG. 5 and 202A of FIG. 8, dual interleave outputs, the NEW INTERLEAVE OUTPUT and the OLD INTERLEAVE OUTPUT; however, it should be understood that principles of the present invention are not limited to the illustrated dual interleave AFIR filters 202 and 202A. Both interleave AFIR filters 202 and 202A can include more than two interleaves. Additional steering arrays and multipliers, as well as appropriate clocking for the steering arrays would be used to provide more interleaves. Also the number of sample and hold circuits 502, 802 would increase to provide more interleaves for a given number of summed products.

Figure 9:
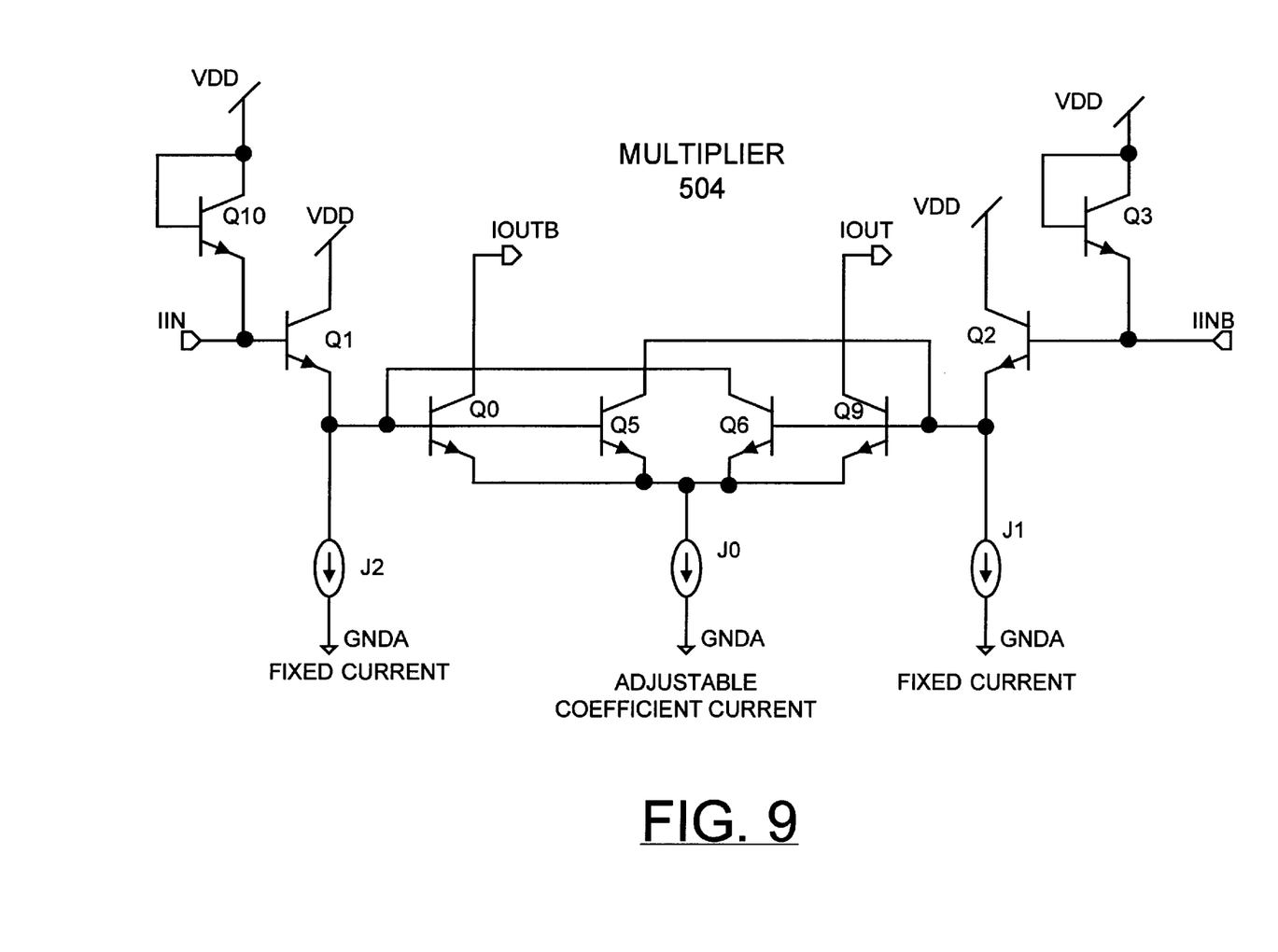
FIG. 9 is a schematic diagram illustrating a multiplier of the preferred embodiment of the interleaved analog finite impulse response (AFIR) filter of FIG. 5.

FIG. 9 is a schematic diagram illustrating a multiplier generally designated as MULTIPLIER 504 of the preferred embodiment of the interleaved analog finite impulse response (AFIR) filter 202 of FIG. 5. Multiplier 504 is a single multiplier with base compensation, as shown in FIG. 9. Multiplier 504 includes an analog differential current input IIN, IINB applied to a base of a pair of NPN transistors Q1 and Q2. The emitter of NPN transistor Q10 arranged in a diode configuration is coupled to the base of transistor Q1. The emitter of NPN transistor Q3 arranged in a diode configuration is coupled to the base of transistor Q2. A pair of fixed current sources J1 and J2 are respectively coupled between the emitters of NPN transistors Q1 and Q2 and ground potential GNDA. Two pairs of NPN transistors Q0 and Q9, Q5 and Q6 are coupled between the emitters of NPN transistors Q1 and Q2. The emitter of transistor Q1 is coupled to the base of transistors Q0 and Q5 in an emitter-follower configuration. The emitter of transistor Q2 is coupled to the base of transistors Q9 and Q6 in an emitter-follower configuration. The collector of transistor Q6 is coupled to the base of transistor Q0. The collector of transistor Q5 is coupled to the base of transistor Q9.

The multiplier output current at nodes IOUTB and IOUT is provided through NPN transistor Q0 and through transistor Q9. An adjustable coefficient current source J0 is coupled between the emitters of the transistor pairs Q0 and Q9, Q5 and Q6 and ground potential GNDA. The fixed current sources J1 and J2 provide identical bias currents. The adjustable coefficient current source J0 determines the multiplier coefficient. In the base compensated multiplier 504, the sum of the current of the base of transistor Q0, the current of the collector of transistor Q6, and the fixed current source J2 equals a constant independent of the differential input current IIN, IINB. Likewise, the sum of the current of the base of transistor Q9, the current of the collector of transistor Q5, and the fixed current source J1 equals a constant independent of the differential input current IIN, IINB. The base compensation provided by the collector current of transistors Q5 and Q6 enables a substantially linear response of the multiplier 504 over a wide range of magnitude of the coefficient current.

Figure 10:
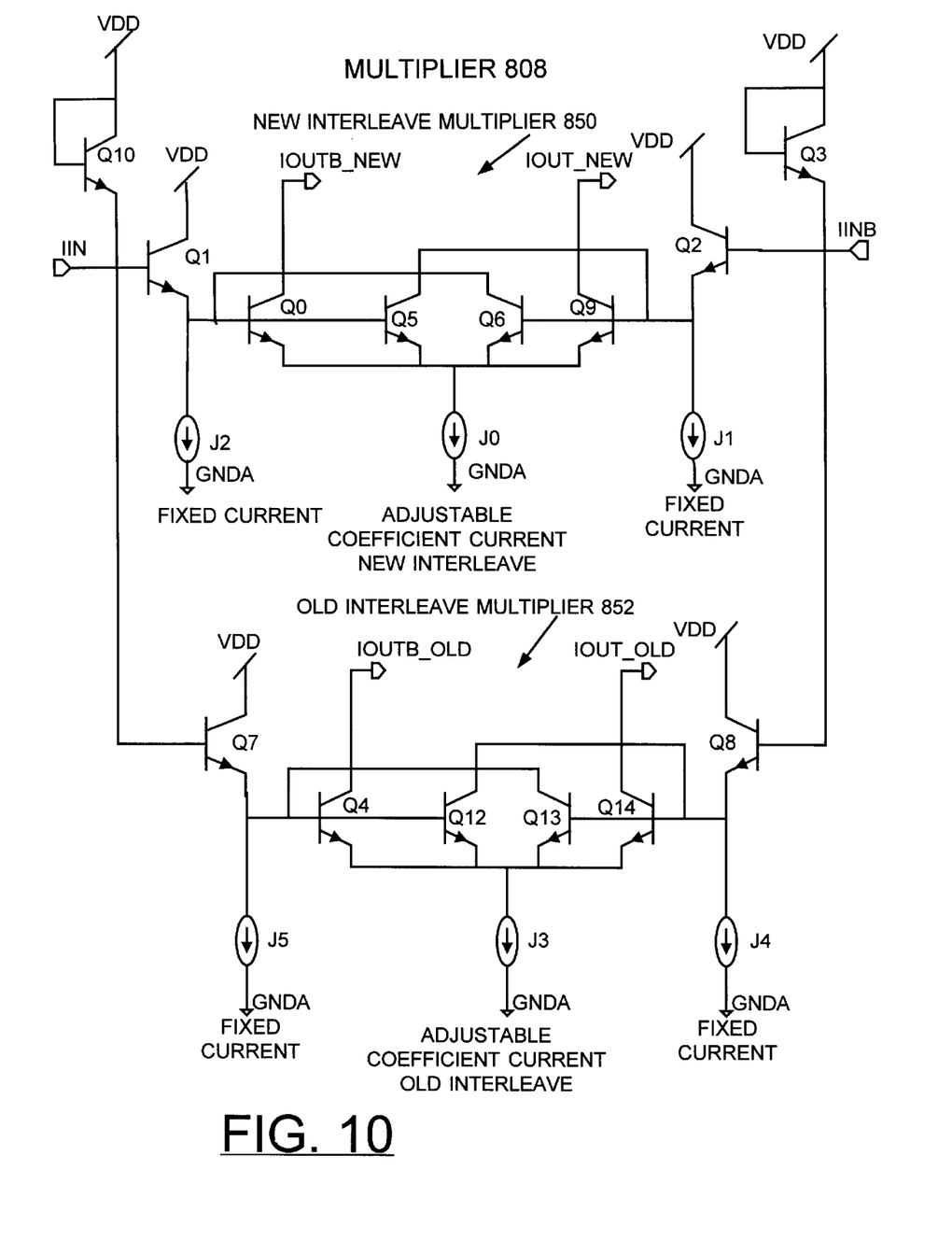
FIG. 10 is a schematic diagram illustrating a multiplier of the preferred embodiment of the interleaved analog finite impulse response (AFIR) filter of FIG. 8.

FIG. 10 is a schematic diagram illustrating a multiplier generally designated as MULTIPLIER 808 of the preferred embodiment of the interleaved analog finite impulse response (AFIR) filter 202A of FIG. 8. Multiplier 808 provides dual independent multiplier functions generally designated as NEW INTERLEAVE MULTIPLIER 850 and as OLD INTERLEAVE MULTIPLIER 852, each multiplier including base compensation. In the dual multiplier 808 the same reference characters are used with respect to the single multiplier 504 as shown in FIG. 9. The new interleave multiplier 850 is provided with identical components as described above with respect to the single multiplier 504 of FIG. 9. The multiplier output current at nodes IOUTB_NEW and IOUT_NEW is provided through NPN transistor Q0 and through transistor Q9, as described above.

The old interleave multiplier 852 is provided with the analog differential current input IIN, IINB also applied to a base of a pair of NPN transistors Q7, Q8. A pair of additional fixed current sources J4 and J5 are respectively coupled between the emitters of NPN transistors Q7 and Q8 and ground potential GNDA. Two pairs of NPN transistors Q4 and Q14, Q12 and Q13 are coupled between the emitters of NPN transistors Q7 and Q8. The emitter of transistor Q7 is coupled to the base of transistors Q4 and Q12 in an emitter-follower configuration. The emitter of transistor Q8 is coupled to the base of transistors Q13 and Q14 in an emitter-follower configuration. The collector of transistor Q13 is coupled to the base of transistor Q4. The collector of transistor Q12 is coupled to the base of transistor Q14. The multiplier output current at nodes IOUTB_OLD and IOUT_OLD is provided through NPN transistor Q4 and through transistor Q14. An additional, independent adjustable coefficient current source J3 is coupled between the emitters of the transistor pairs Q4 and Q14, Q12 and Q13 and ground potential GNDA. The fixed current sources J4 and J5 provide identical bias currents. The adjustable coefficient current source J3 determines the multiplier coefficient for the old interleave multiplier 852. In the old interleave multiplier 852, base compensation provided by the collector current of transistors Q12 and Q13 enables a substantially linear response of the multiplier 852 over a wide range of magnitude of the coefficient current.

While the present invention has been described with reference to the details of the embodiments of the invention shown in the drawing, these details are not intended to limit the scope of the invention as claimed in the appended claims.

What is claimed is:

1. An interleaved finite impulse response (FIR) filter comprising:

a plurality of sample and hold circuits, each for sampling an input signal sequentially at a clock rate;

at least one set of multiple multipliers coupled to said plurality of sample and hold circuits, each multiplier for multiplying a sample by predefined value and providing a multiplier product at said clock rate; said multiplier of said at least one set of multiple multipliers including a current multiplier; said current multiplier receiving an analog differential current input from one said sample and hold circuit and being arranged for substantially linear operation; and at least a pair of summing functions, each said summing function coupled to one said set of multipliers for adding a predetermined combination of respective multiplier products and for providing at least a pair of interleave outputs; each said interleave output changing state every two periods of said clock rate.

2. An interleaved finite impulse response (FIR) filter as recited in claim 1 wherein said pair of summing functions providing said pair of interleave outputs including a new interleave output and an old interleave output and wherein said interleave output is provided at one-half said clock rate.

3. An interleaved finite impulse response (FIR) filter as recited in claim 1 wherein said current multiplier includes an adjustable current source arranged to provide said multiplier predefined value.

4. An interleaved finite impulse response (FIR) filter as recited in claim 3 wherein said current multiplier includes a pair of transistors providing an analog differential current multiplier product, said transistors coupled to said adjustable current source and arranged for substantially linear operation.

5. An interleaved finite impulse response (FIR) filter as recited in claim 1 wherein said current multiplier includes a dual current multiplier; said dual current multiplier receiving an analog differential current input from one said sample and hold circuit and providing dual analog differential current multiplier products.

6. An interleaved finite impulse response (FIR) filter as recited in claim 5 wherein said dual current multiplier includes a pair of adjustable current sources, said adjustable current sources arranged to provide said multiplier predefined value for said dual analog differential current multiplier products.

7. An interleaved finite impulse response (FIR) filter as recited in claim 1 wherein said input signal is an amplified read signal in a data detection channel and wherein said clock rate equals a data rate multiplied by a coding factor.

8. A direct access storage device comprising:
- a transducer means for reading information from a disk surface to produce a readback signal;
- a finite impulse response (FIR) filter for receiving said readback signal and providing a filtered output signal; said finite impulse response (FIR) filter including:
  - a plurality of sample and hold circuits, each for sampling said readback signal sequentially at a clock rate;
  - at least one set of multiple multipliers coupled to said plurality of sample and hold circuits, each multiplier for multiplying a sample by predefined value and providing a multiplier product at said clock rate; said multiplier of said at least one set of multiple multipliers including a current multiplier; said current multiplier receiving an analog differential current input from one said sample and hold circuit and being arranged for substantially linear operation; and
  - at least a pair of summing functions, each said summing function coupled to one said set of multipliers for adding a predetermined combination of respective multiplier products and for providing at least a pair of interleave outputs; each said interleave output changing state every two periods of said clock rate.

9. The direct access storage device as recited in claim 8 wherein said pair of summing functions providing said pair of interleave outputs including a new interleave output and an old interleave output and wherein said interleave output is provided at one-half said clock rate.

10. The direct access storage device as recited in claim 8 wherein said clock rate equals a data rate multiplied by a coding factor in a data detection channel.

* * * * *